US005942867A

United States Patent [19]

Richmond

[11] Patent Number: 5,942,867

[45] Date of Patent: Aug. 24, 1999

[54] GATE OPERATOR PROVIDING IMPACT REDUCTION AT A FIXED END POSITION OF MOVEMENT

[75] Inventor: Moscow K. Richmond, Inglewood, Calif.

[73] Assignee: Doorking, Inc., Inglewood, Calif.

[21] Appl. No.: 09/036,607

[22] Filed: Mar. 6, 1998

[51] Int. Cl.[6] ........ H02P 1/00

[52] U.S. Cl. ........ 318/280; 49/138

[58] Field of Search ........ 318/282, 266, 318/468, 469; 49/138, 31, 322; 361/143, 144

*Primary Examiner*—William M. Shoop, Jr.
*Assistant Examiner*—Rina I. Duda
*Attorney, Agent, or Firm*—Robert J. Schaap

[57] ABSTRACT

A gate operator which provides for an opening and closing movement of a gate in response to an external opening and closing signal. The gate operator of the invention cushions the movement and reduces the impact against a fixed member at the fully opened and/or fully closed positions with a magnetically operable gate repelling and gate attracting arrangement. The repelling and attracting arrangement functions as a switching system and comprises a first magnetically operable member, such as a permanent magnetic, on a fixed member at the end position, or otherwise on the gate, and an electromagnet on the other of the fixed member or gate. In this way, the magnetically operable system applies a momentary force to the gate in opposition to the movement to that end position and then releases the force to reduce impact with any abutment at that end position. The magnetic force is then reversed and provides a magnetic locking action when the gate is at that end position.

23 Claims, 2 Drawing Sheets

GATE OPERATOR PROVIDING IMPACT REDUCTION AT A FIXED END POSITION OF MOVEMENT

BACKGROUND OF THE INVENTION

1. Field of the Invention

This invention relates in general to certain new and useful improvements in gate operators and, more particularly, to improved gate operators which utilize a magnetically operable switching means at a closed or opened position, or both, for applying a force in opposition to the movement of the gate toward an end position shortly in advance of that end position and then releasing that force during movement of the gate to reduce any impact with an abutment at the end position.

2. Brief Description of the Related Art

In recent years, gate operators have become quite popular and are receiving widespread use, both for residential environments and business environments. Frequently, it is desirable to use a gate system for controlling access to a business office or otherwise to an apartment building or home. In order to provide either vehicle or pedestrian access, or both, gate operators are frequently employed and control the opening and closing movement of the gate.

Most gate operators usually employ a motor mechanism, such as an electrically or hydraulically powered motor along with one or more connecting arms which connect the motor to the gate in order to provide for an opening and closing driving movement. Moreover, the operator frequently will include some form of electronic control system for controlling the movement of the gate between the opened and closed end positions. This system typically relies upon a sensor mechanism to generate a count as, for example, the number of counts of rotation of a movable member which is correlated to the degree of movement of the gate. This count is then used in the processor of the operator in order to determine the distance of movement of the gate from one end position to the other end position.

One system of the type for controlling gate movement between two fixed end positions is more fully described in U.S. Pat. No. 4,429,264, dated Jan. 31, 1984, to Moscow K. Richmond. Other embodiments of this control system are described in U.S. Pat. No. 5,136,809, dated Aug. 11, 1992, to Moscow K. Richmond, et al, and U.S. Pat. No. 2,230,179, dated Jul. 27, 1993, to Moscow K. Richmond, et al.

The aforesaid gate operators are effectively designed to move the gate between the fixed opened and closed end positions and to stop movement of the gate when the gate reaches that fixed end position. However, because of the environment in which these gate operators are located, usually an outside environment, tolerences cannot be critical. Changes of temperature will cause the metal components to either slightly expand or contract thereby requiring a slightly longer or slightly shorter movement of the gate between fixed end positions in the same path during subsequent movements. In like manner, wear and tear on the various components will introduce other factors which preclude precise tolerance conditions. As a result, and even with those prior art gate operators which measure the distance between the fixed end positions, after a period of time, the gate will slam into an abutment at one or both of these fixed end positions.

The impact of the gate against an abutment at a fixed end position only introduces further error into the already loose tolerances, thereby worsening the possibility of impact with future opening and closing movements. In addition, the impact of the gate at these fixed end positions can ultimately result in damage to the gate and to components of the operator. At a minimum, the impact of the gate with an abutment at an end position will mar the gate, resulting in an unsightly position, not to mention the undesirable noise created by the gate when engaging an abutment at a fixed end position.

U.S. Pat. No. 4,159,599, dated Jul. 3, 1979, by Moscow K. Richmond for "Gate Opening and Closing Assembly" discloses a gate which is slidable between opened and closed positions and which uses a solenoid operated locking mechanism. U.S. Pat. No. 4,313,281, dated Feb. 2, 1982, by Moscow K. Richmond for "Gate opening and Closing Apparatus and Method" also discloses a positive locking mechanism for use in locking a gate when it reaches a gate closed position. U.S. Pat. No. 4,330,958, dated May 25, 1982, by Moscow K. Richmond for "Gate opening and Closing Assembly With Automatic Locking Means" also discloses a gate opening and closing assembly with an automatic locking means for locking the gate when it reaches a closed position.

It would be desirable to provide a system for temporarily repelling the movement of the gate toward that fixed end position to reduce the speed of the gate and, hence, the possibility of a hard impact with an abutment at a fixed end position. It would also be desirable for the system to thereafter provide a positive locking of the gate at that fixed end position, precluding an authorized opening thereof. However, to date, there has not been any effective system or any process for accomplishing this result.

OBJECTS OF THE INVENTION

It is, therefore, one of the primary objects of the present invention to provide a gate operator which temporarily arrests movement of a gate at a fixed end position, shortly in advance of the gate reaching that fixed end position, to thereby reduce the force of an impact with an abutment at that fixed end position.

It is another object of the present invention to provide a gate operator of the type stated which also permits a positive locking action after temporarily arresting the movement of a gate when the gate reaches that fixed end position.

It is a further object of the present invention to provide a gate operator of the type stated which employs a magnetically operable switching means for initially and momentarily applying an opposition force to a gate movement toward a fixed end position and then releasing the force to reduce the amount of the impact against any abutment at the end position, and which further provides for initiation of an additional closing force when the gate reaches that fixed end position.

It is also an object of the present invention to provide improvements to an existing gate operator which allows for the cushioning of an impact at a fixed end position resulting from opening and closing movement and which can thereby be constructed at a relatively low unit cost.

It is another salient object of the present invention to provide an improvement for use in gate operators which allows for cushioning the effect of an opening and closing movement of a gate controlled by that operator and which is adapted for use in a wide variety of conventional gate operators.

It is still another salient object of the present invention to provide a method of opening and closing a gate between fixed end positions and reducing the impact with an abutment at least one of those fixed end positions.

With the above and other objects in view, my invention resides in the novel features of form, construction, arrangement and combination of parts presently described and pointed out in the claims.

SUMMARY OF THE INVENTION

The present invention relates in general to an improved gate operator and also to improvements in existing gate operators which provide for opening and closing movement of the gate in response to a signal and which also cushions the effect of a closing or opening action at one or both of those end positions. The operator of the invention causes the generation of a force in opposition to the opening or closing movement and then the releasing of the force to reduce the amount of an impact against any abutment at the fixed end position.

The operator of the invention further provides for a gradual but fairly rapid reduction of that repelling force and with the addition of a force tending to further move the gate toward that fixed end position. The operator finally causes a locking action of the gate when at that fixed end position precluding unauthorized opening of the gate.

The gate operator of the invention and the improvement to existing gate operators relies upon the provision of a magnetic switching and controlling assembly which generates a repelling action against movement of a gate to a fixed end position shortly in advance of that end position and the additional force to move the gate to the closed end position and further provides a positive locking action. The magnetically operable switching and controlling means preferably comprises a permanent magnet on one of the fixed members at an end position on a gate and an electromagnet on the other of the gate or fixed member at that end position. Preferably, the electromagnet is mounted on the gate, although the alternate arrangement could be employed.

The present invention can provide for the same action at both the open and the closed positions or only at one of those positions. In the case where the gate may abut against a fixed member at the gate opened position and the gate closed position, it would be desirable to provide a permanent magnet at each of those fixed end positions with electromagnets on the gate, or otherwise electromagnets at the fixed end positions with a permanent magnet on the gate.

The gate operator of the invention preferably reduces the repelling magnetic action fairly rapidly as the gate approaches and is in near proximity to that fixed end position. At that point in time, the movement of the gate has slowed substantially and the operator will thereupon provide a slight boast by creating a positive magnetic force causing movement of the gate toward that fixed end position. After the gate does reach the fixed end position, a processor in the gate operator will increase the magnetic force between the permanent magnet and the electromagnet in order to create a positive magnetic locking action.

The preferred gate operator of the present invention also measures the distance of movement of the gate between the opened to closed fixed end positions and from the closed to the opened fixed end positions. These distances are stored as initial movement measurements. Thereafter, the operator of the invention will cause movement of the gate for subsequent opening to closing movements and subsequent closing to opening movements to move only for that measured distance. Thus, the processor in the gate operator of invention will recognize when the gate is reaching that end position and will cause operation of the magnetically operable switching means in the manner as previously described.

The unique gate operator of the present invention and the improvement to existing gate operators as well as the method of cushioning the effect of a closing and opening action with respect to an abutment at a fixed end position thereby fulfills the aforementioned objects. One of the forms of this improved gate operator or otherwise the improvement to existing gate operators and the method is hereinafter described in more detail in the following detailed description of the invention and illustrated in the accompanying drawings. These drawings and detailed description are only set forth for purposes of illustrating the general principles of the invention and, therefore, are not to be taken in a limiting sense.

BRIEF DESCRIPTION OF THE DRAWINGS

Figure 1:
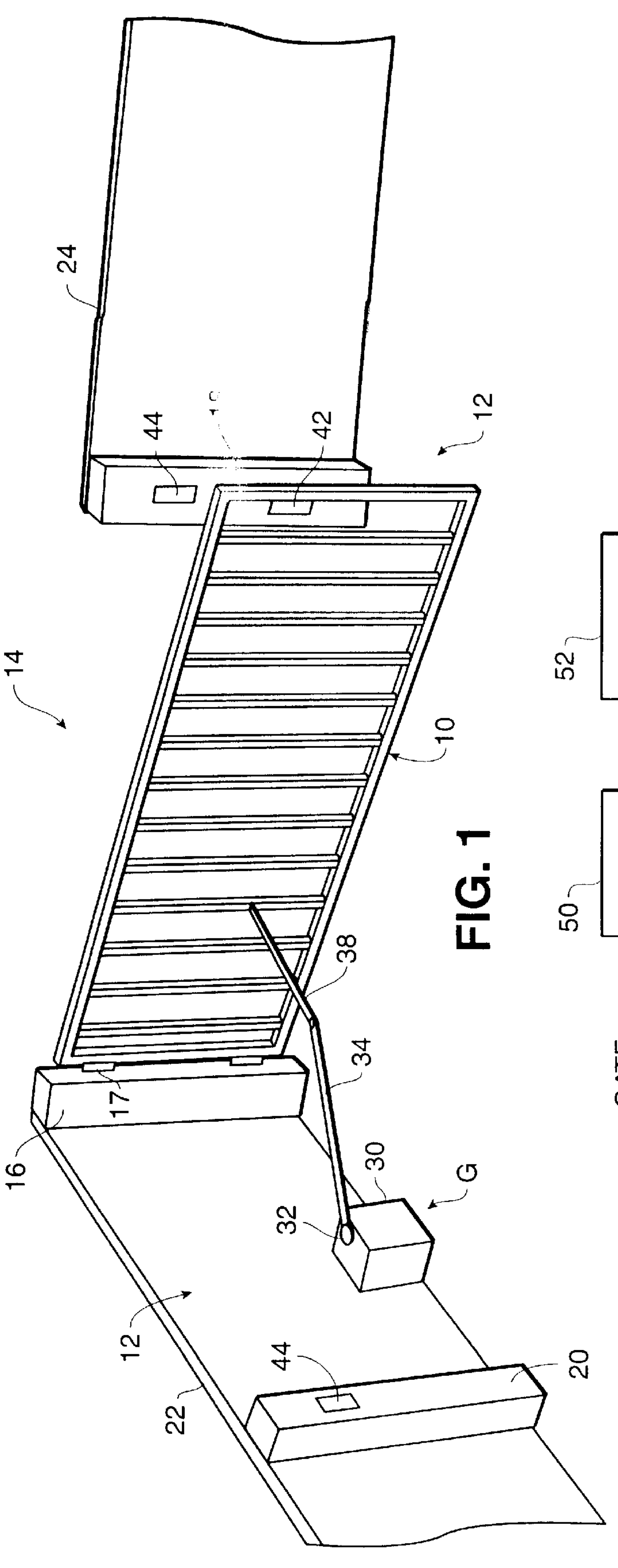
Figure 2:
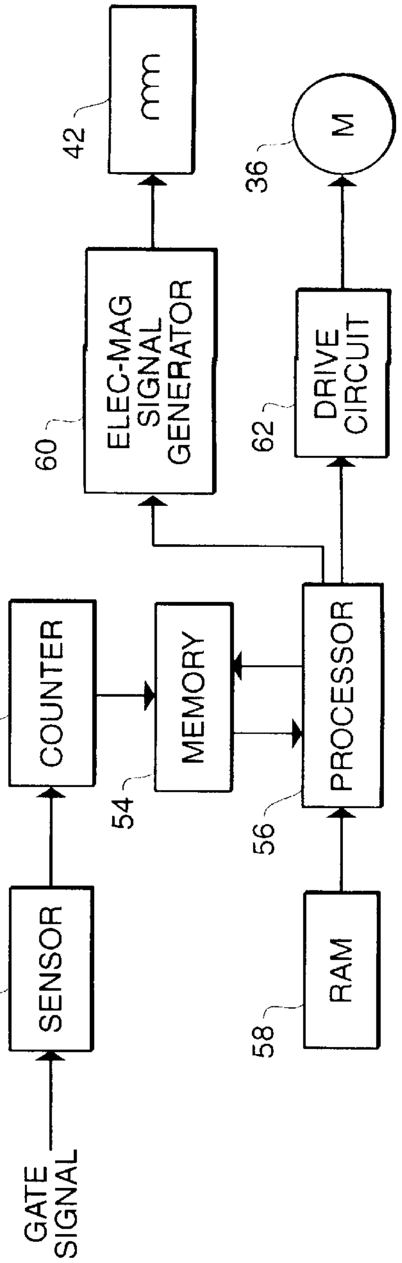
Figure 3:
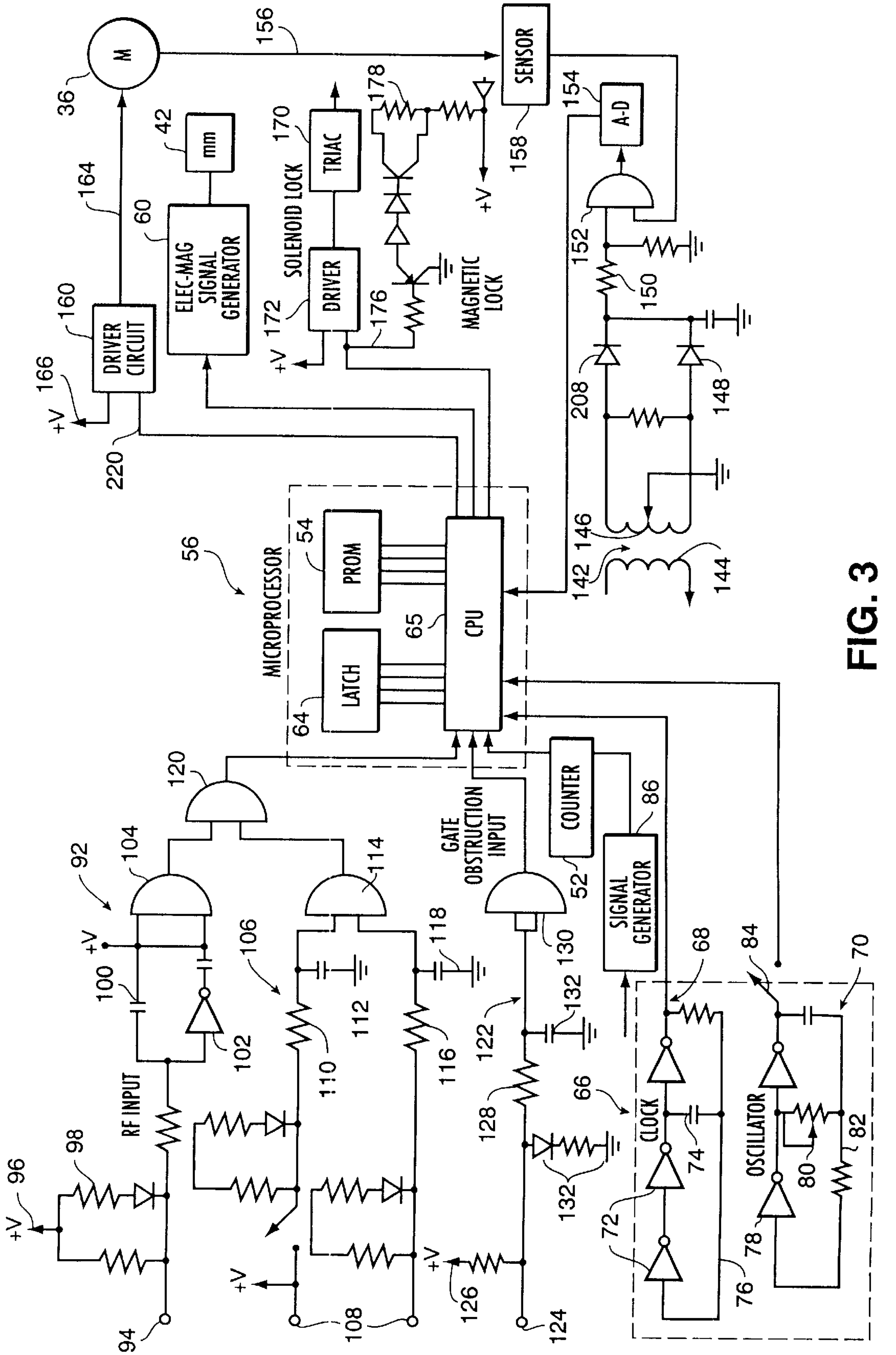

Having thus described the invention in general terms, reference will now be made to the accompanying drawings in which:

FIG. 1 is a fragmentary perspective view showing an improved switching and controlling system for repelling the movement of a gate toward a fixed end position momentarily and shortly in advance of that end position to reduce the force of an impact and thereafter provide a position driving force;

FIG. 2 is a simplified schematic electrical circuit view showing the major electrical components forming part of the circuit for accomplishing this opening and closing movement and reducing the force of an impact against an abutment at a fixed end position; and FIG. 3 is a detailed schematic electrical circuit view showing the overall circuit for accomplishing the opening and closing movement and reducing the force of an impact against an abutment at a fixed end position.

DETAILED DESCRIPTION OF A PREFERRED EMBODIMENT

Referring now in more detail and by reference characters to the drawings which illustrate a preferred embodiment of the present invention, G represents a gate operator for moving a gate 10 between a gate fully opened position 12 and a gate fully closed position 14.

The gate 10, in the embodiment as illustrated, is generally of conventional construction and is hinged on a fixed post 16 or other structure by means of hinges 17. The gate 10 is capable of moving to the fully closed end position 14 against or adjacent to an abutment 18 in the nature of an upstanding post. In like manner, and in the embodiment as illustrated, the gate 10 will engage or become adjacent to an abutment 20, in the nature of a post, at the fully opened position 12, as illustrated in FIG. 1. It can be seen, in the illustrated embodiment, that a wall 22 extends across the fully closed position and a wall 24 extends beyond the gate at the post 18. Thus, access is provided through a gate opening 26.

It should be understood that abutment tabs could be provided on each of the posts 18 and 20 to engage the gate at the end positions. However, these tabs or otherwise the posts are fixed structures which constitute a fixed member or an abutment at these end positions.

The gate operator of the present invention comprises an operator housing 30 as shown in FIG. 1 and containing an upstanding drive shaft 32. Connected to the drive shaft 32, and being rotatable therewith in response to operation of a drive motor 36 (see FIG. 2) as hereinafter described, the drive arm 34 will swing in an arcuate path when the drive motor 36 located within the drive housing 30 is energized.

Connected to the outer end of the drive arm 34 is a connecting arm 38 which is, in turn, connected to the gate 10, all as best shown in FIG. 1. Thus, energization of the motor 36 will cause driving movement of the drive arm 34 and the connecting arm 38 and this will, in turn, cause an opening or closing movement of the gate 10 depending upon the direction of rotation of the drive shaft 32.

It should be understood that an operator, such as a ground mounted operator G, as shown in FIG. 1, could be provided, such that the drive housing would be mounted on a fixed structure, such as a wall or a post. In like manner, other means for connecting the drive motor 36 to the gate 10 could also be employed and it is not necessary to rely upon the drive arm 34 and the connecting arm 38.

The present invention also provides a magnetic switching and controlling assembly which allows for the control or movement of the gate 10 between the opened and closed positions. This magnetic switching and control assembly comprises an electromagnet 42 mounted on the gate 10 in the manner as shown. The electromagnet 42 is preferably exposed on both faces of the gate in the embodiment as illustrated where the pair of posts 18 and 20 are located at the two end positions. However, a separate electromagnet 42 could be located on each of the opposite sides of the gate. The electromagnet 42 cooperates with permanent or fixed magnets 44 located on each of the posts 18 and 20. However, it should be understood that the electromagnet could be reversed in position with the permanent magnets, such that the electromagnets are mounted on the posts 18 and 20 and a permanent magnet is located in the gate 10. Moreover, it should also be understood that all of the magnets could be electromagnets if desired.

It should be understood that this magnetic switching and controlling assembly which provides for a reduction of force of an impact can be incorporated in new gate operators, or otherwise, it may be incorporated in existing operators. Preferably, it is desirable for use in operators in which the operator measures the distance of movement between the closed and opened positions and only moves the gate for that measured distance. However, it can be used effectively in any operator. Even with those operators which do not provide for measurement of the distance and concomitant movement of the gate for that measured distance, the magnetic switching and controlling assembly of the present invention is still highly effective in that it reduces the force of an impact at those fixed end positions.

The operator of the present invention is highly effective in that it initially and momentarily applies a magnetic force in opposition to a movement of the gate to a fixed end position. This force is only applied momentarily in order to substantially arrest movement of the gate toward that fixed end position, and only shortly in advance of the end position. Thus, when the gate is being moved to a closed position, the operator will provide a driving action for driving gate at a relatively constant speed from the opened position to the closed position. Shortly in advance of the closed position, the operator will energize the electromagnet causing the repelling force. This will, in turn, cause the gate to substantially slow its movement and thereby reduce the force of any impact.

However, the gate may be arrested in its movement substantially so that it would unduly slow a complete closing movement. As a result, the processor then generates an additional magnetic force assisting in this closing movement, that is moving the gate to the end position toward which it was traveling. That force is then released as the gate reaches the closed position. Thereafter, a positive locking action is provided at the closed position by creating a relatively strong magnetic force between the permanent magnet and the electromagnet.

FIG. 2 illustrates a general simplified circuit schematic diagram showing the major components forming part of the circuit of the present invention and generally comprises a sensor 50 which receives a gate signal as shown. This gate signal may adopt any of a variety of forms of gate signals, such as a radio frequency signal from a remote unit, a key signal from a lock or magnetically encoded card, or the like. As the sensor receives a signal, it will cause initiation of a counter 52 operating in conjunction with a memory 54 and a central processor, such as a microprocessor 56. The microprocessor operates under the control of a random access memory 58.

As indicated previously, the gate operator is preferably one which measures the distance of movement from a closed position to an opened position and moves the gate precisely for that distance, and also measures the distance from the opened position to the closed position and moves the gate precisely for that measured distance. The microprocessor 56 of the present invention operating in conjunction with the memory 54, such as a read only memory, and the random access memory 58 performs that function.

When the gate approaches the fixed end position as, for example, the closed position, a signal is initiated from the microprocessor to an electromagnetic signal generator 60. This generator, in turn, energizes the electromagnet 42.

The processor 56 also provides an output to a drive circuit 62 which, in turn, provides an output signal to the motor 36 causing either energization or de-energization of the motor 36. Shortly after the gate signal is received, the microprocessor 56, operating in conjunction with the memory, as aforesaid, and the counter 52 will measure the movement of the gate as it moves from, e.g. the opened position to the closed position. As the gate reaches that closed position, the microprocessor 56 will cause the electromagnetic signal generator 60 to initiate a signal which is repelling signal to that of the driving movement of the gate. Thus, the motor 36 is driving the gate from the opened position to the closed position.

As that gate reaches the closed position, and shortly in advance of the closed position, the electromagnetic signal generator 60 will generate a magnetic signal in opposition to that generated by the fixed magnet. Thus, if the fixed magnet 44 is a positive polarity fixed magnet, the electromagnetic singal generator 60 will generate a positive polarity magnetic signal, thereby causing an opposition to movement of the gate to the fixed magnet. This opposition will cause a slowing movement of the gate and operates against the driving movement of the motor 36.

If desired, the motor 36 could be provided with an output routed back directly to the microprocessor 56, as hereinafter shown and described, recognizing an increased current generated in the motor 36 because of the opposition force. This would cause the microprocessor 56 to reduce the driving action on the motor 36 or otherwise eliminate the driving action of the motor 36.

When the gate reaches the fully closed position, a positive electromagnetic signal is then generated. In this case, and assuming the fixed magnet 44 was a positive polarity magnet, the electromagnetic signal generator 60 would generate a negative polarity signal to cause an attraction of the gate to the fixed abutment. In this way, a positive locking action is achieved.

FIG. 3 illustrates a more detailed circuit schematic which forms part of the operator of the present invention. The microprocessor 56 comprises the programmable read only memory 54 as well as a latching circuit 64 and a central processing unit 65.

The microprocessor 56 operated by a master clock circuit 66, a pulse generating circuit 68 and an adjustable oscillator 70. The clock pulse generating circuit 68 includes a plurality of inverting amplifiers 72, in the manner as illustrated, along with a capacitor 74 connected across a feedback line 76 between the inverting amplifiers 72. The oscillator 70 also comprises a pair of inverting amplifiers 78 with an adjustable resistor 80 connected in a feedback loop 82 across the amplifiers 78. A switch 84 may be provided for turning the oscillator off and on. The master clocking circuit 66 provides the necessary controlled timing for the operation of the entire control unit 56. In addition, the adjustable oscillator 70 controls the rate of movement of the gate during opening and closing.

A signal generator 86 receives an input from a movement measuring member as, for example, a magnetic sensor which measures the degree of rotations of a rotatable shaft and which thereupon generates a signal representative of a degree of rotation of that shaft and, hence, movement of the gate. This type of magnetic pulse generating member is more fully described in U.S. Pat. No. 5,230,179, dated Jul. 27, 1993. The signal generator 86 receives this input over an input line 88 and generates electrical signals responding to the amount of rotation of that rotatable element. This signal is then introduced into the counter 52 and, more specifically, into the central processing unit 65 for determining the distance of movement of the gate. In this case, the counter 52 will determine the number of counts of rotation of the drive shaft and introduce that number of counts into the central processing unit 65 of the microprocessor 56. In this way, the distance of movement of the gate is known and the opening and closing movement of the gate can be controlled on all subsequent opening and closing movements.

The microprocessor 56 also receives an input from a radio frequency input circuit 92, as illustrated in FIG. 3. This circuit would include a radio frequency sensor 94 connected to a voltage supply 96 forming part of or connected to a resistive network 98. The output of the sensor 94 is introduced through a filtering capacitor 100 and an inverting amplifier 102 into an And gate 104.

The microprocessor 56 also receives a key input from a key input circuit 106 and which also has a key operated mechanism identified by a pair of inputs 108. One of the inputs 108 is connected to a voltage supply, as illustrated. This same input is connected through a coupling resistor 110 and grounded capacitor 112 to an And gate 114. The other of the inputs 108 is also connected through a resistor 116 and a capacitor 118 to the And gate 114. These two inputs are added in the And gate 114 and the output of the key operated circuit 106 is added with the output of the radio frequency input circuit in another And gate 120. The output of this And gate 120 is thereupon introduced into the central processing unit 65.

The control unit of the present invention also comprises a gate obstruction input circuit 122. In this case, a voltage rise, as a result of a back EMF may be generated in the armature of the motor which causes a signal designated by the input 124. This signal is connected to a positive voltage source 126 and is introduced through a coupling resistor 128 into a pair of inputs of an And gate 130. A grounded capacitor 132 and diode resistor arrangement are also connected to the input of the And gate 130.

A current sensing transformer 142 is provided for detecting a current rise signal in the field winding of the motor and comprises a primary winding 144 and a secondary winding 146, the later of which has a grounded center tap. Connected to each of the terminals of the secondary winding 146 are a pair of diodes 148. A voltage dividing network 150 is also connected to the output of one of the diodes 148 and is, in turn, connected to an And gate 152 and which is introduced into an analog to digital converter 154, also as best shown in FIG. 3. The motor 36 may have an output feedback signal over a feedback line 156 introduced into a current sensor 158 and which is, in turn, is also introduced into the And gate 152. In this way, the transformer 142 can detect a current rise in the field winding of the motor. This would be due to the fact that as the gate reaches the closed position, the electromagnet would be generating a magnetic field which is of the same polarity as that of the fixed magnet 44, thereby repelling the gate. This would, in turn, cause a current rise in the field winding of the motor which would be sensed by the sensing transformer 142. In like manner, a feedback signal from the motor through the line 156 and current sensor 158 could also be Anded to that signal from the current sensing transformer 142 and this information provided to the central processing unit 65.

The central processing unit would thereupon cause a cessation of or otherwise a reduction of driving action to the motor 36 through a driver circuit 160 receiving an output of the central processing unit 65. As this occurs, either the driving action can be reduced or eliminated, as aforesaid. The feedback line 156 and the current sensor 158 are not necessary in accordance with the present invention, but can be used in the manner as previously described.

As indicated previously, the opposition force is generated only as the gate approaches the end position. When the gate reaches the fully closed position, this opposition force is stopped. The central processing unit will recognize when the gate has reached that fully closed position, since it measures the distance of movement of the gate. At that time, re-energization of the electromagnetic signal generator 60 could cause energization of the electromagnet 42.

The driving circuit 160 is connected to the motor through a driving signal line 164 and to a positive driving source 166, also as best shown in FIG. 3 of the drawings.

It is also possible to provide a solenoid locking circuit for achieving a positive lock when the gate reaches the fully closed position or otherwise the fully opened position. Actually, it is only necessary to provide this positive locking action when the gate reaches the fully closed position. The locking action could be that which is described in U.S. Pat. No. 5,136,809 in which a signal is generated to cause the motor to operate in such manner that it forces movement of the gate to the closed position in the event of an opposition force applied to the gate. In other words, the motor will force the gate to the closed position against the action of someone attempting to move the gate to the opened position. The other type of locking action which may exist is that of initiating a locking action signal to a locking solenoid (not shown) causing a locking pin to move into a locked position.

If desired, a solenoid locking circuit 170 may be employed, as shown in FIG. 3. This locking circuit will include a driver 172 operating in conjunction with a triac 174 and an output from the central processing unit 65 is introduced into a magnetic lock 176 having an output to a lock input circuit 178, as shown. In this way, if desired, a positive magnetic lock can also be provided at the gate for fully locking the gate in the fully closed position.

Thus, there as been illustrated and described and unique and novel gate operator as well as an improvement in gate operators and also a method for moving a gate between open and closed end positions and which allows for cushioning the effect of any impact by the gate against an abutment or other fixed member at an open or closed position. The present invention thereby fulfills all of the advantages and objects which have been sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described my invention, what I desire to claim and secure by Letters Patent is:

1. A gate operator which provides for opening and closing movement of a gate in response to a signal and which cushions the effect of the closing or opening actions at a closed fixed end position, said operator comprising:

a) driving means for causing an opening movement and a closing movement of the gate in response to an external command; and b) magnetically operable switching and control means at the closed fixed end position for initially and momentarily applying an opposition force to the movement of the gate in response to said signal and in opposition of the closing movement and then releasing the opposition force to reduce the amount of an impact against any abutment at the closed fixed end position.

2. The gate operator of claim 1 further characterized in that magnetically operable switching and control means is also at the opened end position for initially and momentarily applying an opposition force to the gate in opposition to the opening movement and then releasing the force to reduce the amount of any impact against any abutment at the opened fixed end position.

3. The gate operator of claim 1 further characterized in that said magnetically operable switching and control means is an electromagnetically operable switching and control means.

4. The gate operator of claim 1 further characterized in that said magnetically operable switching and control means is comprised of magnetic means on said gate and magnetic means aligned therewith on a fixed member at said closed end positions.

5. The gate operator of claim 4 further characterized in that said magnetically operable switching and control means comprises a permanent magnet located at one of said gate or fixed member at said end position and an electromagnet operable in response to said signal located at the other of said gate or fixed member at said fixed end position.

6. The gate operator of claim 5 further characterized in that processing means forms part of said operator and controls operation of said electromagnet to cause a momentary energization of same and thereby generate a momentary repelling action as said gate approaches and is near said fixed end position.

7. The gate operator of claim 6 further characterized in that said processing means causes a reduction of said repelling action as said gate is very close to said fixed end position.

8. The gate operator of claim 7 further characterized in that said processing means causes a locking action using the magnetically operable switching means as the gate reaches that end position.

9. An improvement in gate operators of the type which provides for opening and closing movement of a gate from an opened end position to a closed end position and which also controls movement therebetween with a drive motor causing the opening and closing movement in response to an external command, said improvement comprising:

a) magnetically operable switching means at one of the end positions for initially and momentarily applying an opposition force to the gate and in opposition to the closing movement and then releasing the force to reduce the amount of an impact against any abutment at that end position.

10. The improvement in the gate operator of claim 9 further characterized in that the end position is a closed end position, and magnetically operable means is also at the opened end position for initially and momentarily applying an opposition force to the gate in opposition to the opening movement and then releasing the force to reduce the amount of any impact against any abutment at the opened end position.

11. The improvement in the gate operator of claim 9 further characterized in that said magnetically operable switching means is comprised of magnetic means on said gate and magnetic means aligned therewith on said abutment member at one of said end positions.

12. The improvement in the gate operator of claim 11 further characterized in that said magnetically operable switching means comprises a permanent magnet located at one of said gate or abutment at said end position and an electromagnet operable in response to said signal located at the other end of said gate or abutment at said fixed end position.

13. The improvement in the gate operator of claim 12 further characterized in that processing means forms part of said operator and controls operation of said electromagnet to cause a momentary energization of same and thereby generate a momentary repelling action as said gate approaches and is near said fixed end position.

14. The improvement of the gate operator of claim 13 further characterized in that said processing means causes a reduction of said repelling action as said gate is very close to said fixed end position, said processing means also causing a locking action using the magnetically operable switching means as the gate reaches that end position.

15. A gate operator which provides for opening and closing movement of a gate in response to a signal and which cushions the effect of closing or opening actions at at least one of said end positions, said operator comprising:

a) driving means for causing movement of a gate between a gate opened end position and a gate closed end position in response to an external gate command;

b) a driving member connecting said driving means to said gate for driving the gate between the opened end position and the closed end position in response to receipt of said external gate command;

c) first gate repelling means on a fixed member at one of said end position;

d) second gate repelling means associated with said gate and being operable in conjunction with said first gate repelling means for temporarily repelling the gate only for a short period of its travel as it approaches that end position to thereby reduce the force of an impact with any structure at that end position having the fixed member; and e) control means for initiating a signal as said gate approaches and is in close proximity to the end position having the first gate repelling means to cause the repelling action to reduce the force of any impact at that end position and then releasing the repelling action to allow the gate to fully move to that end position.

16. The gate operator of claim 15 further characterized in that each of said first and second gate repelling means are magnetically operable gate repelling means.

17. The gate operator of claim 16 further characterized in that one of said first and second gate repelling means is a permanent magnet and the other is an electromagnetically operable means.

18. The gate operator of claim 16 further characterized in that a processing means forms part of said operator and controls operation of said electromagnet to cause a momentary energization of same and thereby generate a momentary repelling action as said gate approaches and is near said fixed end position.

19. The gate operator in claim 18 further characterized in that said processing means also measures the distance of movement between the end positions and is operable to control the initiation of the signal as the gate approaches that end position.

20. The gate operator of claim 19 further characterized in that processing means forms part of said operator and controls operation of said electromagnet to cause a momentary energization of same and thereby generate a momentary repelling action as said gate approaches and is near said fixed end position, said processing means causing a reduction of said repelling action as said gate is very close to said fixed end position.

21. The method of opening and closing a gate between a gate opened fixed end position and a gate closed fixed end position and also reducing impact with an abutment at least at one of said end positions, said method comprises:

a) momentarily energizing an electromagnetic means at one of said gate or said fixed end position operating in conjunction with a magnetic means at the other of said gate or fixed end position to create a force in opposition to movement of the gate to that fixed end position and then releasing that force to reduce the amount of an impact of the gate against any abutment at that end position.

22. The method of claim 21 further characterized in that said method comprises causing a reduction of the repelling action if the gate is very close to said fixed end position.

23. The method of claim 21 further characterized in that said method comprises causing a locking action of the gate at that fixed end position when the gate reaches the fixed end position.

* * * * *